(12) United States Patent
Chan

(10) Patent No.: US 6,703,865 B2
(45) Date of Patent: Mar. 9, 2004

(54) LINE-DRIVER WITH POWER DOWN LOOPBACK PROTECTION

(75) Inventor: Kevin T. Chan, Pasadena, CA (US)

(73) Assignee: Broadcom Corporation, Irvine, CA (US)

( * ) Notice: Subject to any disclaimer, the term of this patent is extended or adjusted under 35 U.S.C. 154(b) by 9 days.

(21) Appl. No.: 09/983,818

(22) Filed: Oct. 26, 2001

(65) Prior Publication Data

US 2002/0057017 A1 May 16, 2002

Related U.S. Application Data

(60) Provisional application No. 60/243,483, filed on Oct. 26, 2000.

(51) Int. Cl.[7] ............... H03K 19/0175; H03K 19/003

(52) U.S. Cl. .............................. 326/82; 326/33

(58) Field of Search ................ 326/82–83, 86–87, 326/31, 33–34; 327/108, 109, 50–52

(56) References Cited

U.S. PATENT DOCUMENTS

| | | | | | |
|---|---|---|---|---|---|
| 5,442,697 | A | * | 8/1995 | McGary et al. | 379/399.02 |
| 5,467,369 | A | * | 11/1995 | Vijeh et al. | 375/224 |
| 5,596,568 | A | * | 1/1997 | Fleshren | 370/249 |
| 5,668,494 | A | * | 9/1997 | Nicollini et al. | 327/416 |
| 5,790,294 | A | * | 8/1998 | Horiuchi et al. | 359/177 |
| 6,175,865 | B1 | | 1/2001 | Dove et al. | 709/220 |

OTHER PUBLICATIONS

English-language Abstract of JP 05 122291 A, (May 18, 1993—date of publication), 1 page.
"Handier interfacing for data communication on the move," *Electronics World and Wireless World*, Reed Business Publishing, vol. 97, No. 1677, Aug. 1992, pp. 676–678.
Copy of International Search Report for Appln. No. PCT/US01/42817, issued Oct. 31, 2002, 6 pages.
Press Release, "Broadcom Launches Next–Generation Fast Ethernet Transceiver Family," Nasdaq: BRCM, 6 Pages (Sep. 13, 1999).
Press Release, "Broadcom Delivers World's Lowest Power 10/100 Ethernet Transceiver," Business Wire, 6 Pages (May 8, 2000).
Declaration of Kevin T. Chan, dated Jun. 4, 2003.

* cited by examiner

Primary Examiner—James H. Cho
(74) Attorney, Agent, or Firm—Sterne, Kessler, Goldstein & Fox P.L.L.C.

(57) ABSTRACT

A line driver selectively drives one of two transmission lines. The line driver includes a differential amplifier connected to first and second differential switches. The first differential switch is connected between an output of the differential amplifier and a first of two transmission lines. The second differential switch is connected to the output of the differential amplifier and to the second of two transmission lines. The first and second differential switches are controlled by respective first and second control signals. The output of the differential amplifier is connected to either the first or the second transmission line in response to the first and second control signals. The differential switches include loopback protection to an prevent an incoming signal from passing from one transmission line to another during power down mode.

20 Claims, 6 Drawing Sheets

LINE-DRIVER WITH POWER DOWN LOOPBACK PROTECTION

CROSS-REFERENCE TO RELATED APPLICATIONS

This application claims benefit of U.S. Provisional Application No. 60/243,483, filed Oct. 26, 2000, which is incorporated by reference herein in its entirety.

BACKGROUND OF THE INVENTION

1. Field of the Invention

The present invention generally relates to computer connections in a local area network, and more particularly to node devices having Media Dependent Interfaces (MDI) that are installed in such networks and their automatic connection configuration.

2. Background Art

Many local area network products (LAN) use a medium consisting of twisted copper wire pairs for the transmission and reception of data. At a LAN node, one or more twisted pairs transmit data to a second LAN node, and one or more twisted pairs receive data from the second LAN node. This arrangement permits simultaneous data transmission and reception, also called full duplex communications.

In a conventional LAN node with full duplex communications, different twisted pairs are used for transmission and reception. This requires that each end of the link have a defined assignment for its twisted pair connector. For example, a Network Interface Card (NIC) is usually employed as an end node device, while a switch or a repeater will be employed as a concentrator or central component in a star-based network. During link operation, the NIC transmits data on a pair of wires that are connected to the receiver of the hub or switch, and the NIC receives data on a pair of wires that are connected to the transmitter of the hub or switch. If the NIC transmit pair of wires are inadvertently connected to the hub transmit connector, then the communication link will fail. Similarly, if the NIC receive transmit pair of wires are inadvertently connected to the hub receive connector, then the communications link will also fail.

Most LAN standards assign specific connector pins to the wires in the twisted pair to prevent the transmit and receive twisted pairs from being crossed at one of the nodes. In the IEEE-802.3 10BASE-T standard, pins 1 and 2 at an end node are connected to the transmit twisted pair, and pins 3 and 6 are connected to the twisted receive pair. At the hub, which is typically a repeater or a switch for a 10BASE-T network, pins 3 and 6 are connected to the transmit pair, and pins 1 and 2 are connected to the receive pair. This works quite well for configurations where NIC's are attached to repeaters. However, other configurations are possible with the emergence of switched networks. For example, two NICs can be directly connected together, or two repeaters can be directly connected together, or a repeater can be connected to a switch. Depending upon the pin assignment of these devices, it may become necessary to employ a crossover cable to connect two LAN devices that have incompatible pin assignments.

A manual switch can be employed to switch the connections for the transmit and receive pairs for a hub, repeater, or switch. The switch allows the products to connect to other similar devices but requires an installer to manually push a button. The manual approach works well for limited applications like a repeater-to-repeater links, but not in the general case where it is desired to build a LAN device that attaches to either a repeater, a NIC, or a switch, without manual intervention.

What is needed is an automated means of switching transmitter or receiver connections for a generalized LAN device, including a hub, repeater, or a NIC.

BRIEF SUMMARY OF THE INVENTION

The present invention includes a line driver that is used to selectively drive one of two transmission lines. The line driver is a differential amplifier connected to first and second differential switches. The first differential switch is connected between an output of the differential amplifier and a first of two transmission lines. The second differential switch is connected to the output of the differential amplifier and to the second of two transmission lines. The first and second differential switches are controlled by respective first and second control signals. The output of the differential amplifier is connected to either the first or the second transmission line in response to the first and second control signals.

Power down loopback protection is provided by passive devices that prevent an external network signal from feeding through the unpowered line driver differential switches and injecting a false signal into the network.

An advantage of the present invention is more efficient use of valuable integrated circuit space by using a line driver in place of two line drivers.

Another advantage is the use of a single differential amplifier to drive both output transmission lines. This feature greatly reduces or eliminates the need for post assembly line balancing required when two independent line drivers are used.

A further advantage is the excellent signal isolation achieved by coupling a signal to the input of two parallel switches, then maintaining one switch closed while opening the other.

Another advantage is the mitigation of power down loopback signals without adding additional circuitry or using additional chip space. The protection is passive and does not consume any additional power.

Further features and advantages of the present invention, as well as the structure and operation of various embodiments of the present invention are described in detail below.

BRIEF DESCRIPTION OF THE FIGURES

The present invention is described with reference to the accompanying drawings. In the drawings, like reference numbers indicate identical or functionally similar elements. Additionally, the leftmost digit(s) of a reference number identifies the drawing in which the reference number first appears.

DETAILED DESCRIPTION OF THE INVENTION

The present invention generally relates to an apparatus for configuring media connections in a local area network. In one embodiment, the present invention is particularly directed to configuring media connections for use with twisted copper wire pairs. However, other media connections could also be used as will be further described herein. In one embodiment, the invention is particularly suited for local area networks that operate on a 10Base-T standard, a 100Base-T standard, as well a 1000Base-T standard. The invention is also suited for TP-PMD, Token Ring, and others.

Figure 1:
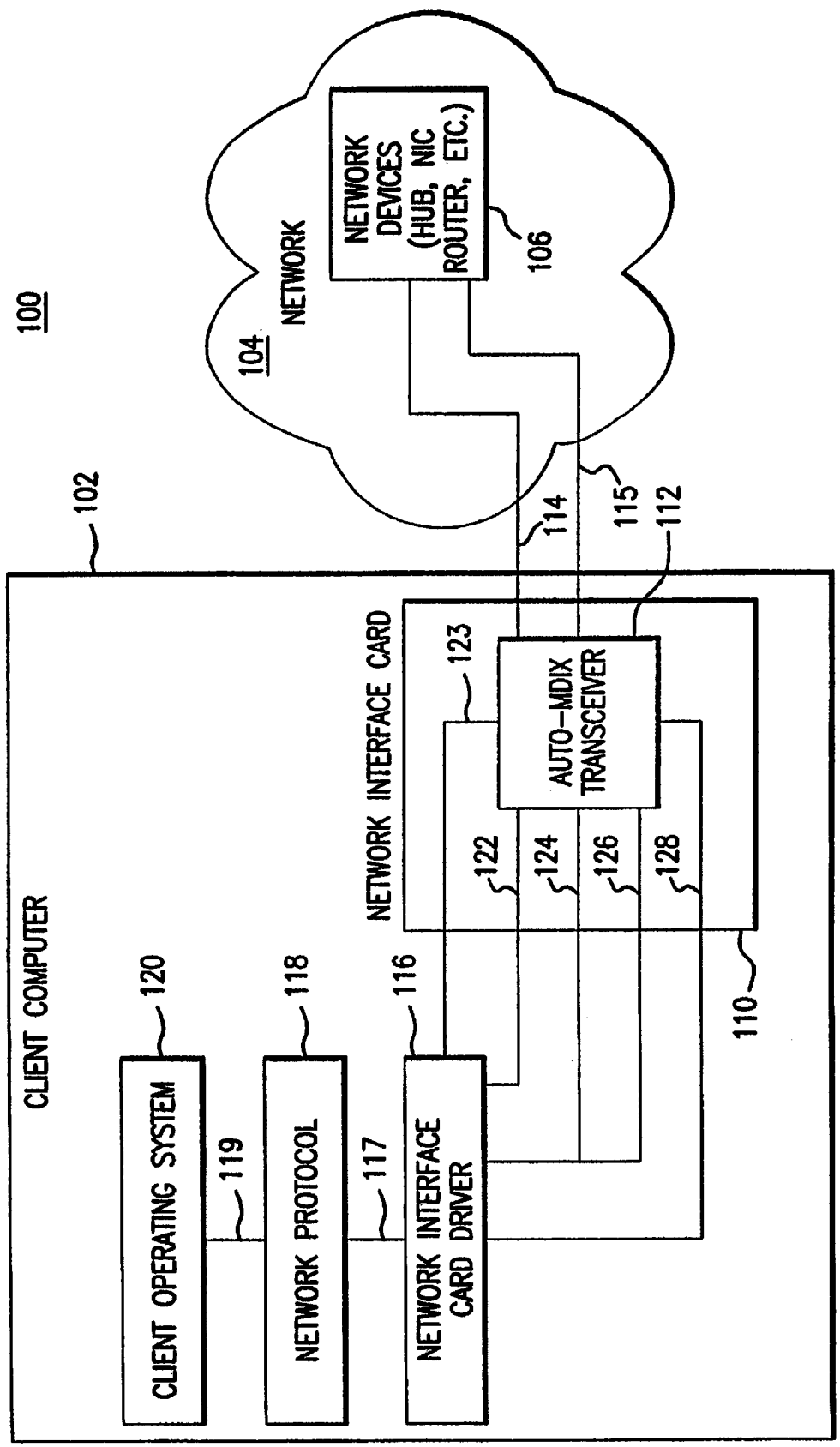
FIG. 1. illustrates an example environment for the invention.

Before describing the invention in detail, it is useful to describe an example environment for the invention. FIG. 1 is a block diagram illustrating an example auto-MDIX environment 100 comprising a client computer 102, a network 104, a plurality of network devices 106, a network interface card 110, an Auto-MDIX circuit 112, a first transmission line 114, a second transmission line 115, a client computer operating system 120, a network protocol interpreter 118, and a network interface card driver 116.

The network interface card (NIC) 110 links the client computer 102 with the network 104. More specifically, the NIC 110 can link the computer 102 to a specific network device 106, or to a group of network machines, or to the network in general (i.e. a query). To exchange data with the network devices 106, the data must be placed in a compatible format for exchange over a network medium and then physically sent over that medium. The client operating system 120 writes a data request 119 to using a client information request to the network 104. The operating system 120 sends the data request 119 to the network protocol interpreter 118. The network protocol interpreter 118 identifies the target network and receives any instructions from the operating system 120 that are to be provided to the NIC 112. Based on information from the operating system 120, the network protocol interpreter 118 generates a data request 117 that in the proper format to be addresses, transmitted, routed, and acted upon by the network 104.

The NIC driver 116 receives network data and determines the transmission medium that is to be utilized. The NIC driver 116 generates specific instructions for the NIC 110 based on transmission medium that is to be utilized. In this example, then NIC 110 uses two transmission lines 114 and 115 to control the transmission of transmit data 124. The NIC driver 116 sends transmission control signals 122 and 123 to control the transmission of the transmit data 124 on the transmission lines 114 and 115, respectively.

After the data is transmitted, the NIC 110 listens for returning data, either from an unrelated event or an answer to a query from the operating system 120. The NIC 110 generates a receiver control signal 128 to ensure the receiver (not shown) is lined up to the correct transmission line and directs the received data 126 to a storage location in the client computer.

The control of receiving and transmitting from the NIC 110 is very important. Twisted pair lines use the same physical media for transmitting and receiving. Collisions of data on a network can cause data loss and possibly reduce network stability.

Figure 2:
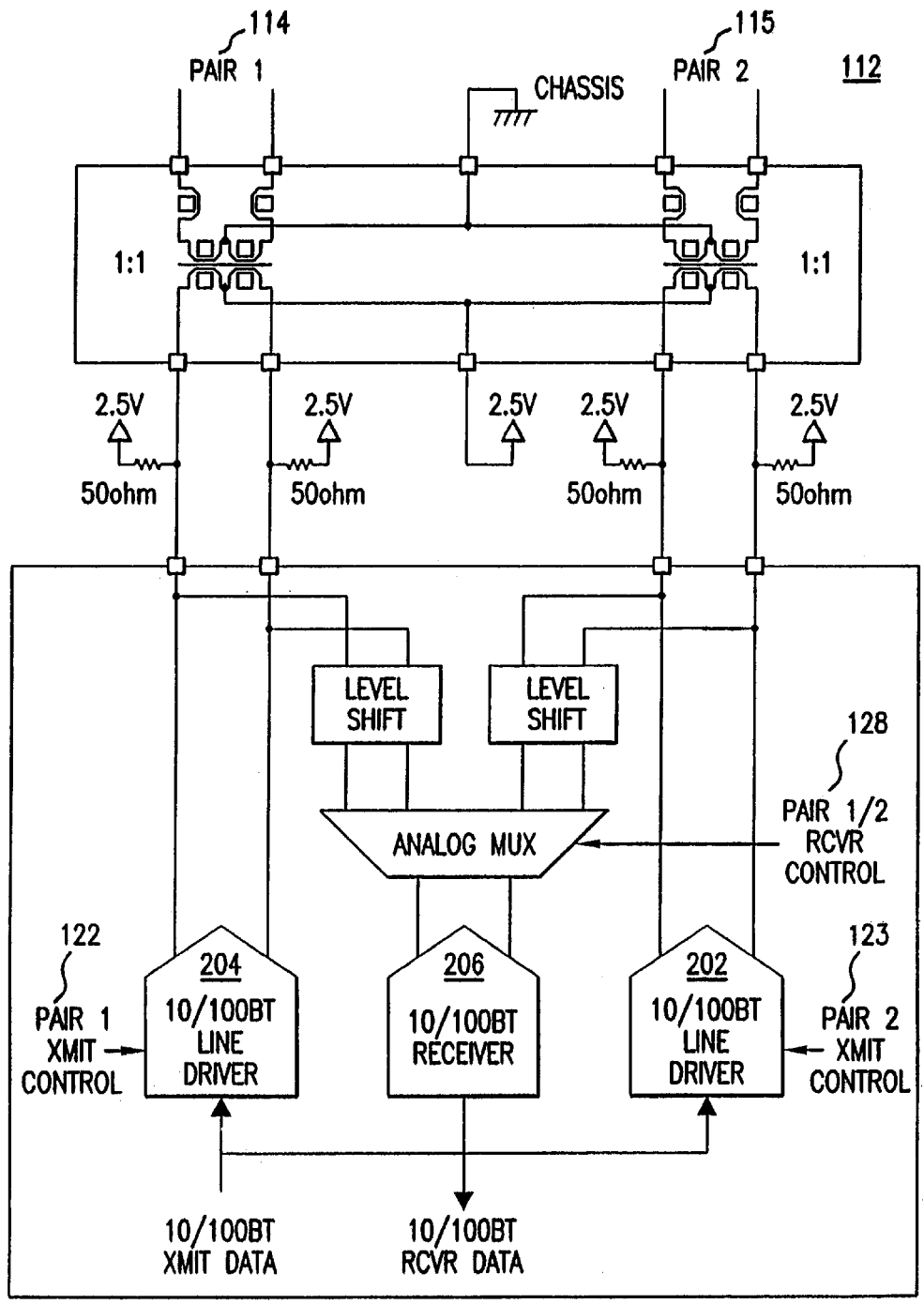
FIG. 2. illustrates a conventional Auto-MDIX circuit.

FIG. 2 illustrates a conventional auto-MDIX circuit 112. Auto-MDIX 112 comprises a first line driver 204, a second line driver 202, a receiver 206, the receiver control signal 128, the first transmit control signal 122, the second transmit control signal 123, the first transmission line 114, and the second transmission line 115.

Transmit data 124 is placed at the input to the first line driver 204 and the second line driver 202. When the first transmit control signal 122 is received, the first line driver 204 transmits data to the first twisted wire pair 114. When the second transmit control signal 123 is received, the second line driver 202 transmits data to the second wire pair 115. If the first line driver 204 is transmitting over the first transmission line 114, the receiver control 128 can direct data from the second transmission line 115 to the receiver 206. Alternatively, if the second line driver 202 is transmitting over the second transmission line 115, the receiver control 128 can direct data from the first transmission line 114 to the receiver 206.

In one embodiment, the invention is implemented using field effect transistors. For simplicity, in the remaining disclosure the abbreviation FET is used to indicate a field effect transistor was used as the component described. One of skill in the relevant art will understand the invention is not limited to implementations having field effect transistors.

Figure 3:
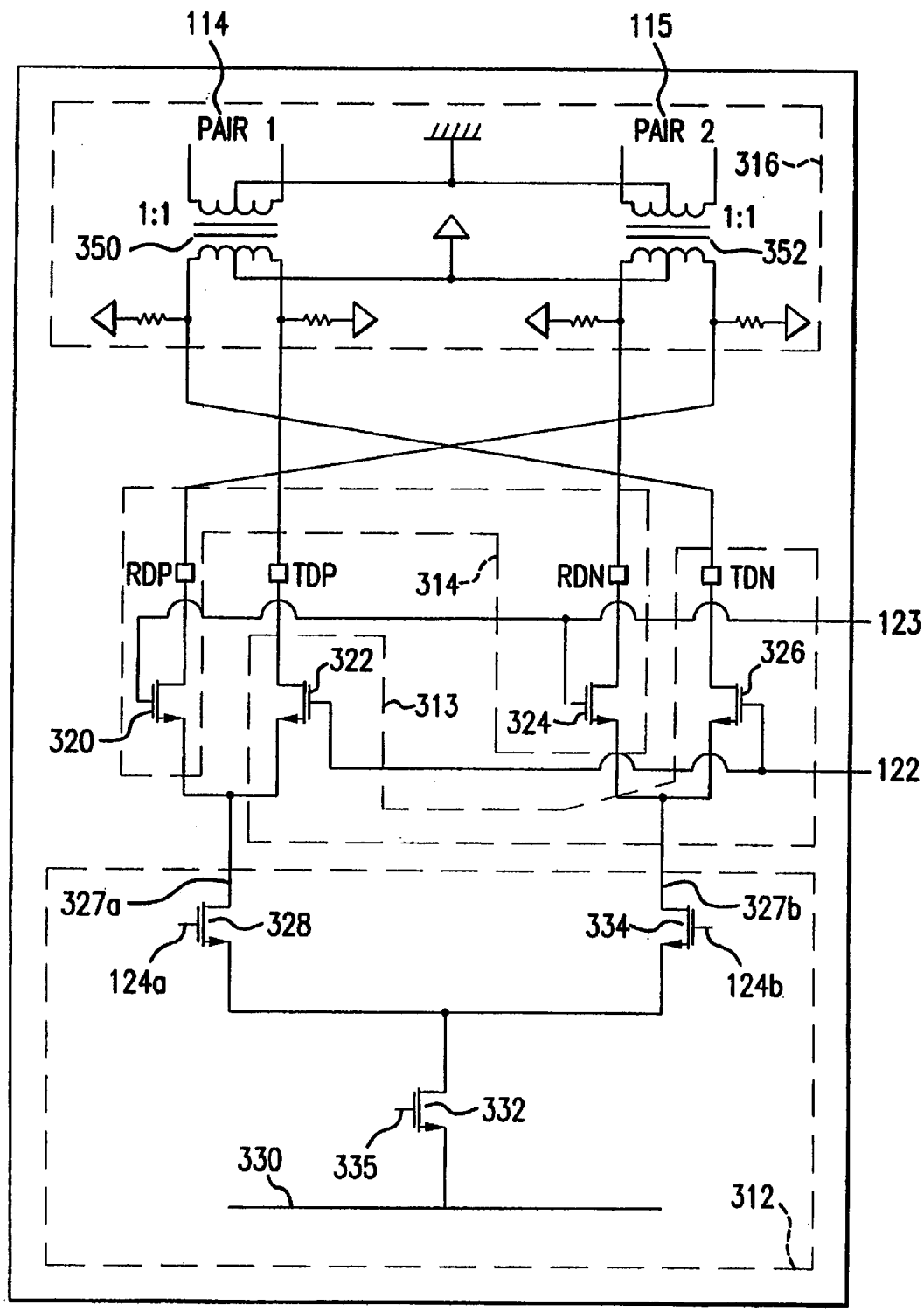
FIG. 3. illustrates a single line-driver Auto-MDIX circuit.

FIG. 3 illustrates a line driver 300 according to embodiments of the invention. The line driver 300 has the ability to drive either the first transmission line 114 or the second transmission line 115 based on the control signals 122 and 123, without the need for a second line driver. The line driver 300 includes a differential amplifier 312 coupled to a first differential switch 313 and a second differential switch 314. The first control signal 122 controls the first differential switch 313, and the second control signal 123 controls the second differential switch 314. A media interface 316 is coupled to the first and second differential switches 313 and 314.

The media interface 316 provides the electrical and mechanical adaptors necessary to couple a desired media with the output of the first and second differential switches 313 and 314. In the embodiment shown in FIG. 3, the transmission lines 114 and 115 are two twisted pair conductors, and the media interface includes a first media coupler 350 and a second media coupler 352, both of which are center tapped transformers. The first media coupler 350 connects the output of the first differential switch 313 to the transmission line 114 and the second differential switch 314 connects the output of the second differential switch 314 to the transmission line 115. The present invention is not limited to twisted pair conductors. Other possible transmission media includes coaxial cable, fiber optic cable, shielded twisted pair, unshielded twisted pair, and other transmission media that will be understood by those skilled in the arts based on the discussion given herein.

The differential amplifier 312 includes a first FET 332, a second FET 328, and a third FET 334 that are configured as shown. The first FET 332 provides a bias current for the second FET 328 and the third FET 334, where the bias current is determined by a bias voltage 335 that controls the gate of the first FET 332. The gate of the second FET 328 receives a first component 124*a* of the differential input signal 124, and the gate of the third FET 334 receives a second component 124*b* of the differential input signal 124. The second FET 328 and the third FET 334 amplify the differential input signal 124 according to the bias current provided by the FET 332. The resulting differential output signal 327 (having components 327*a* and 327*b*) is provided to both the first differential switch circuit 313 and the second differential switch circuit 314.

The differential amplifier 312 is only one circuit configuration for a differential amplifier. Other equivalent differential amplifiers, including other current mode and voltage mode differential amplifiers, could be utilized in the line driver 300. These other differential amplifier configurations are within the scope and spirit of the present invention.

The first differential switch 313 switches the differential output signal 327 to the first transmission line 114 when the first differential switch 313 is activated by the control signal 122. Likewise, the second differential switch 314 switches the differential output 327 to the second transmission line 115 when the second differential switch 314 is activated by the control signal 123, respectively. Further details of the first and second differential switches 313 and 314 are discussed below.

The first differential switch 313 includes a first FET switch 322 and a second FET switch 326. The source of the first FET switch 322 receives the differential output signal component 327a, and the source of the second FET switch 326 receives the differential output signal component 327b. The gates of the first FET switch 322 and the second FET switch 326 are controlled by the first control signal 122. The drains of the first FET switch 322 and the second FET switch 326 are connected to the first transmission line 114 through the transformer 350.

The second differential switch 314 includes a third FET switch 320 and a fourth FET switch 324. Similar to the first differential switch 313, the source of the third FET switch 320 also receives the differential output signal component 327a, and the source of the fourth FET switch 324 receives the differential output signal component 327b. The gates of the third FET switch 320 and the second FET switch 324 are controlled by the second control signal 123. The drains of the third FET switch 320 and the fourth FET switch 324 are connected to the second transmission line 115 through the transformer 352.

When the client computer 102 is powered-up, transmit control circuitry (not shown) generates the first control signal 122 and the second control signal 123 to select either the transmission line 114 or the transmission line 115 as the active transmission link. Alternatively, neither transmission line can be utilized.

To select the transmission line 114 as the transmission link, the first control signal 122 raises the gate voltage on the first FET switch 322 and the second FET switch 326. The raised gate voltages cause the FETs 322 and 326 to conduct and pass the differential amplifier output signal 127 to the first transmission line 114 for transmission. In embodiments, the control signal 122 is adjusted to cascode FETs 322 and 326 with the differential amplifier 312 to enhance output impedance, improve isolation, and improve overall circuit performance. Furthermore, the second control signal 123 cuts off the third FET 320 and the fourth FET 324, blocking the differential amplifier output signal 127 from the second transmission line 115.

To select the transmission line 115 as the transmission link, the first control signal 122 lowers the gate voltage on the first FET 322 and the second FET 326 so that FETs 322 and 326 are cutoff, thereby blocking the differential output signal 127 from the first transmission line 114. Furthermore, the second control signal 123 raises the gate voltage on the third FET 320 and the fourth FET 324. The raised gate voltages cause the FETs 320 and 324 conduct and pass the differential output signal 127 to the second transmission line 115. In embodiments, the control signal 123 is adjusted to cascode FETs 320 and 324 with the differential amplifier 312 to enhance output impedance, improve isolation, and improve overall circuit performance.

When no signal transmission is desired, then the first control signal 122 lowers the gate voltage on the first FET 322 and second FET 326. Therefore, the FETs 322 and 326 are cutoff, and the differential output signal 127 is blocked from the transmission line 114. Furthermore, the second control signal 123 also lowers the gate voltage on the third FET 320 and the fourth FET 324. Therefore, the FETs 320 and 324 are cutoff, and the differential output 127 is blocked from the transmission pair 115.

In embodiments of the invention, there are more than two transmission lines that can be selected from. As such, the differential switches 313 and 314 can be stepped and repeated any number of times to switch between the multiple transmission lines. In these stepped embodiments, the differential amplifier 112 is stepped and repeated as necessary to provide the desired output voltage and waveshape.

In other embodiments, the line driver 300 can be a cell in a array of cells that make up a larger line driver. Each individual line driver cell can then be controlled to individually provide the appropriate output voltage amplitude and waveshape.

Signal Pass Through and Loopback

The network 104 is active twenty-four hours a day and most user sessions last just a fraction of that time. When a user is finished with the client computer 102, it is shut down and powered off. In many client computer 102 installations the network media is difficult to disconnect, and therefore is left connected to the network interface card 110.

Figure 4:
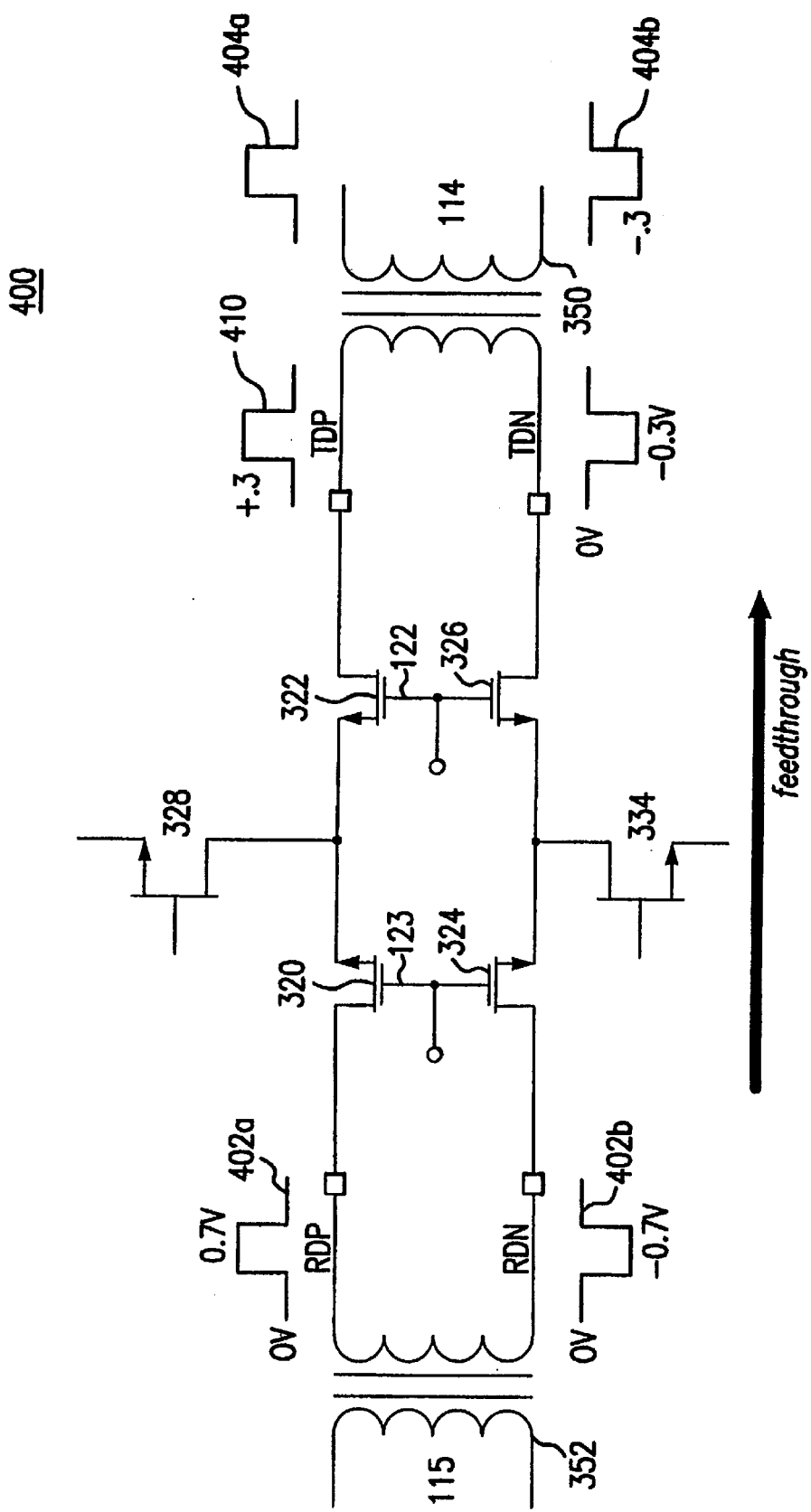
FIG. 4. illustrates a power down loopback transient.

FIG. 4 is a signal switching section 400 that is associated with the signal line driver 300. The signal switching section 400 includes a subset of those elements in the line driver 300 that are needed to illustrate signal feed through and loopback. The elements of the signal switching section 400 are connected identically as in the line driver 300, but the circuit layout is presented to conveniently illustrate signal feedback and loopback that can occur between the first transmission line 114 and the second transmission 115 in the single line loop driver 300.

Referring to FIG. 4, two signal paths exist between the first transmission line 114 and the second transmission line 115. The first path is between the second transmission line 115, a receive data positive (RDP) node, the third FET switch 320, the first FET switch 322, a transmit data positive (TDP) node, and the first transmission line 114. The second path is between the second transmission line 115, a receive data negative (RDN) node, the fourth FET switch 324, the third FET switch 326, a transmit data negative (TDN), and the first transmission line 114.

The first network transmission line 114 and the second network transmission line 115 can carry data to the client computer 102 or carry data from the network 104 to the client computer 102. Inadvertently, connecting two independent transmission media is undesirable and can cause data corruption, data loss, and reduced network 104 stability.

When power is applied to the line driver 300, the first FET switch 322, the second FET switch 326, the third FET switch 320, and the fourth FET switch 324 are biased open or closed by one of two control signals 122 or 123. In each transmit mode, at least one FET switch between the RDP node and the TDP node is biased closed to prevent a signal from flowing between the first and second transmission lines. Likewise, at least one FET switch between the RDN node and the TDN node is also biased closed to prevent a signal from flowing between the first transmission line 114 and the second transmission line 115.

When power is removed from the line driver 300, the voltage of each circuit node falls to ground or floating near ground. A node floats near ground as a result of parasitic coupling or leakage currents from a device that was previously energized.

Referring to FIG. 4, a differential link pulse 402 can be received from the network at the signal switching section 400. For example, the differential link pulse 402 comprises a positive link pulse 402a that is applied at RDP, and a negative link pulse 402b that is applied at RDN. The positive voltage of the positive link pulse 402a raises the drain voltage of the third FET 320 relative to the gate voltage, and therefore opens the third FET switch 320 so that the positive link pulse 402a is blocked.

The negative link pulse 402a, applied at RDN, pulls the fourth FET switch 324 drain below the floating gate, causing the fourth FET switch 324 to conduct and pass the negative link pulse 402b to the source of the second FET switch 326. The negative link pulse 402b drops the voltage on the source of the second FET switch 326 below the floating gate, causing the fourth FET 326 to conduct and pass the negative link impulse 402b to the TDN. The negative link pulse 402b is applied to the first media coupler 350 and induces a positive loopback pulse 410 at the TDP node. The negative link pulse 402b and the positive loopback voltage 410 are passed through the media coupler 350 and are transmitted as a differential false pulse 404 (having components 404a and 404b) on the first transmission line 114. These false pulses 404 are undesirable as they can collide with legitimate data on the network. Also, these false pulses 404 can appear as (unintentional) valid data packets being sent back to the hub or source.

A negative incoming signal (e.g., 402b) can arrive at one or more of the nodes RDP, RDN, TDP, or TDN, depending on how accurately the network cabling is installed. Power down loopback protection can prevent the negative signals 402b from producing false signals 402, and is described in the following section.

Power Down Loopback Protection

Figure 5:
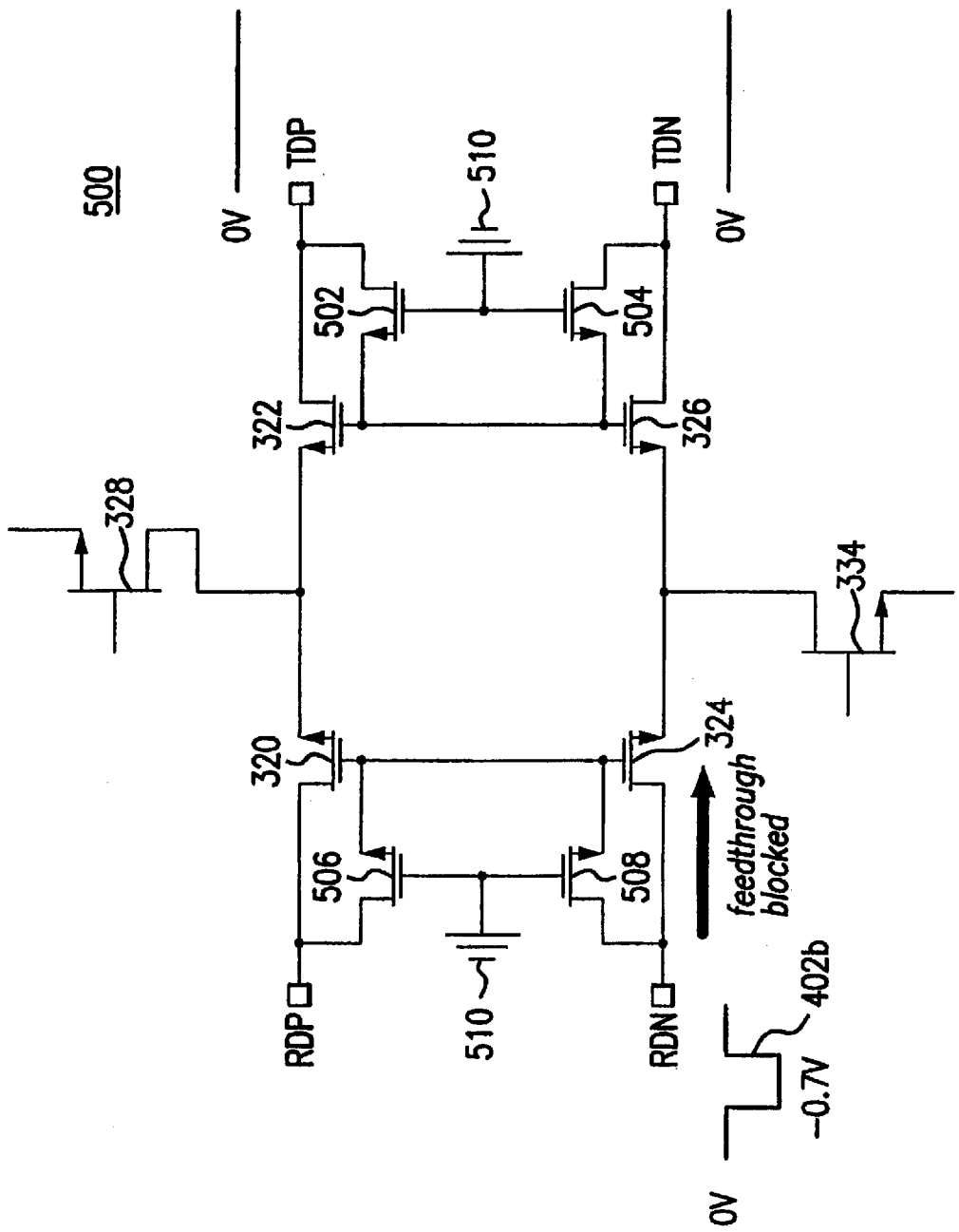
FIG. 5. illustrates details of power down loopback protection.

FIG. 5 illustrates a modified signal switching section 500, which is the signal switching section 400 modified with loop back protection. More specifically, the modified signal switching section 500 includes the switching section 400 and a first loopback FET 502, a second loopback FET 504, a third loopback FET 506, and a fourth loopback FET 508. (The media transformers 350 and the 352 are not shown for convenience of illustration.)

The loopback FET 502–508 are configured as follows. The gates of all the loopback FETs 502–508 are coupled to a ground 510. The source of the first loopback FET 502 is coupled to the gate of the first FET switch 322, and the drain of the first loopback FET 502 is coupled to the drain of the first FET switch 322. The source of the second loopback FET 504 is coupled to the gate of the second FET switch 326, and the drain of the second FET switch 326 is coupled to the drain of the second loopback FET 504. The source of the third loopback FET 506 is coupled to the gate of the third FET switch 320, and the drain of the third loopback FET 506 is coupled to the drain of the third FET switch 320. The source of the fourth loopback FET 508 is coupled to the gate of the fourth FET switch 324, and the drain of the fourth loopback FET 508 is coupled to the drain of the fourth FET switch 324.

Since the gate of each loopback FET 502–508 is grounded, each loopback FET will conduct if the source or drain voltage drops below the transistor threshold voltage $V_T$. When a loopback FET conducts, it pulls the associated FET switch gate down, following the negative input voltage. By forcing the gate of the FET switch to follow the negative input voltage, the FET switch is always off and will not feed through the negative input pulse.

For example, if the negative voltage 402b is applied to RDN in FIG. 5, the loopback FET 508 will conduct and pass the negative voltage 402b to the gate of the fourth FET switch 324. As a result, the negative voltage 402b will be applied to both the source and the gate of the switch FET 324. Therefore, the source and the gate of the FET 324 will be at approximately the same potential, and the FET 324 will not conduct. Therefore, the negative voltage 402b will be blocked from the second switch FET 326, and will not produce a false pulse on the transmission line 114. The other loopback FETs 502–506 operate in a similar manner when a negative pulse 402b is applied to particular drain nodes of the loopback FETs 502–508. Thus, the other loopback FET 502, 504, and 506 provide similar loopback protection for their respective switching FETs 322, 326, and 320.

When the modified signal switching section 500 is powered up, the gate of each loopback FET 502–508 is grounded. The source and the drain of each loopback FET are biased above ground potential, so the loopback FET is cutoff and has no effect on the respective FET switch 332–326 during normal powered up operations.

Figure 6:
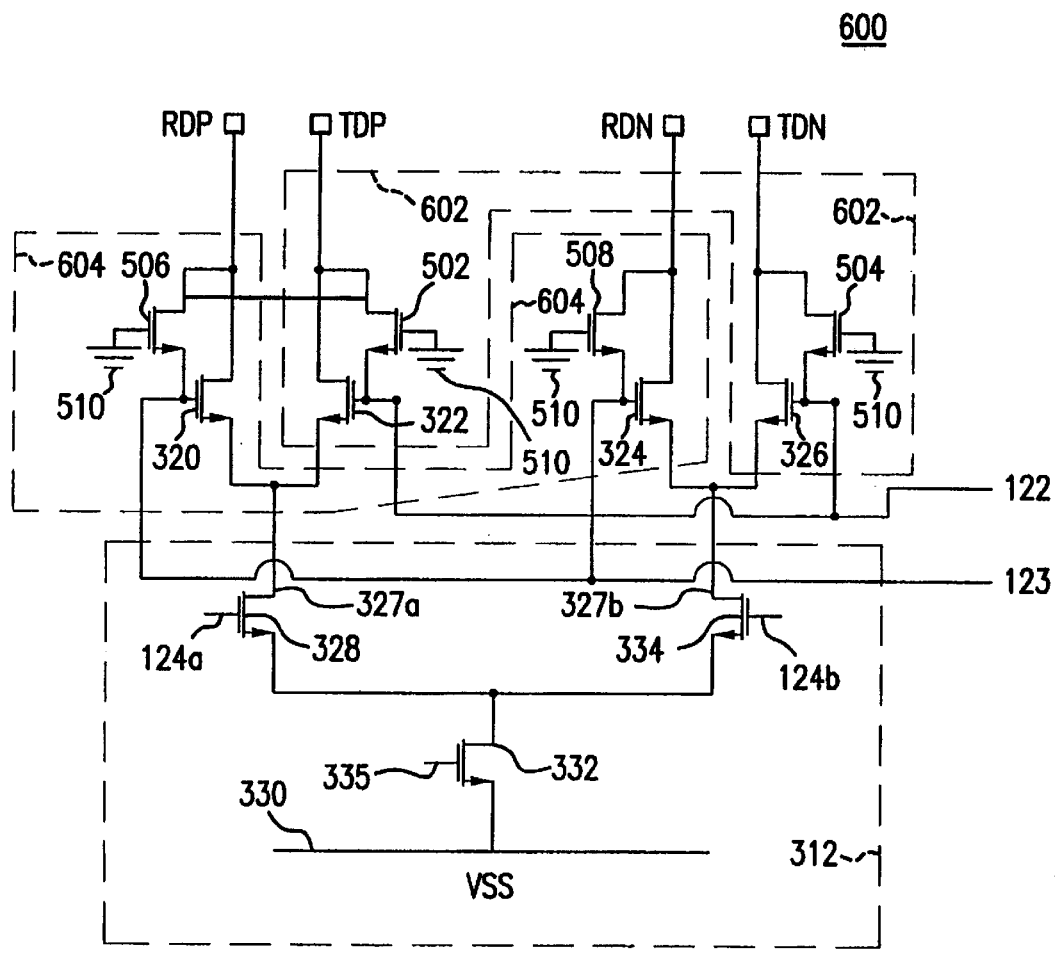
FIG. 6. illustrates an Auto-MDIX line-driver with power down loopback protection.

FIG. 6 illustrates a modified line driver 600. The modified line driver 600 is the single driver 300 with the loopback protection FETs 502–508 added to the respective switching FETs 302–326, to create modified differential switches 602 and 604.

In the modified differential switch 602, the gates of the first and second loopback FETs 502, 504 are coupled to the ground 510. The sources of the first and second loopback FETs 502, 504 are coupled to the gate of the first FET switch 322 and the second FET switch 326, respectively. The drains of the first and second loopback FETs 502, 504 are coupled to the drains of the first FET switch 322 and the second FET switch 326, respectively.

In the modified differential switch 604, the gates of the third and fourth loopback FETs 506, 508 are coupled to the ground 510. The sources of the third and fourth loopback FETs 506, 508 are coupled to the gates of the third FET switch 320 and the fourth FET switch 324, respectively. The drains of the third and fourth loopback FETs 506, 508 are coupled to the drains of the third FET switch 320 and the fourth FET switch 324, respectively.

As discussed in relation to FIG. 5, a negative pulse at RDN will cause loopback FET 508 to conduct so that the drain and the gate of switching FET 324 are at the same potential. Therefore, the switching FET 324 will not conduct and the negative going pulse will be blocked from the TDN node, preventing a retransmission over the transmission line 115. The other loopback FET 502, 504, and 506 provide similar loopback protection for their respective switching FETs 322, 326, and 320. Therefore, no negative incoming signals on either transmission line 114 or 115 will be retransmitted on the other transmission line.

In embodiments of the invention, there are more than two transmission lines that can be selected from. As such, the differential switches 602 and 604 can be stepped and repeated any number of times to switch between the multiple transmission lines. In these stepped embodiments, the differential amplifier 112 is stepped and repeated as necessary to provide the desired output voltage and waveshape.

In other embodiments, the line driver 600 can be a cell in an array of cells that make up a larger line driver. Each line driver cell can have the loopback protection FETs (e.g. 506, 502, 508, and 504) as shown in FIG. 6. Alternatively, since the cells are arrayed in parallel, only one set of loopback protection FETs can be connected to the appropriate FETs in the multiple cells.

CONCLUSION

Example embodiments of the methods, circuits, and components of the present invention have been described herein. As noted elsewhere, these example embodiments have been described for illustrative purposes only, and are not limiting. Other embodiments are possible and are covered by the invention. Such embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. A line driver, for driving one of two transmission lines, comprising:
    a differential amplifier that receives an input signal;
    a first differential switch having an input coupled to an output of said differential amplifier and an output coupled to a first of said two transmission lines;
    a second differential switch having an input coupled to said output of said differential amplifier and an output coupled to a second of said two transmission lines;
    a loopback prevention circuit configured to prevent at least one of said first differential switch and said second differential switch from conducting during a power down mode;
    said first and second differential switches controlled by respective first and second control signals; and
    wherein an output of said differential amplifier is coupled to one of said first and second transmission lines using said first and second control signals.

2. The line driver of claim 1, wherein said first transmission line is coupled to said output of said differential amplifier by closing said first differential switch and opening said second differential switch using said respective first and second control signals.

3. The line driver of claim 1, wherein said second transmission line is coupled to said output of said differential amplifier by opening said first differential switch and closing said second differential switch using said respective first and second control signals.

4. The line driver of claim 1, wherein said first differential switch comprises:
    a first FET coupled between said output of said differential amplifier and a first terminal of said first transmission line; and
    wherein said loopback prevention circuit includes a second FET having a grounded gate, a source of said second FET coupled to a gate of said first FET, a drain of said second FET coupled to said first terminal of said transmission line.

5. The line driver of claim 4, wherein said first differential switch further comprises:
    a third FET coupled between said output of said differential amplifier and a second terminal of said first transmission line; and
    wherein said loopback prevention circuit further includes a fourth FET having a grounded gate, a source of said fourth FET coupled to a gate of said third FET, a drain of said fourth FET coupled to said second terminal of said first transmission line.

6. The line driver of claim 5, wherein said second differential switch comprises:
    a fifth FET coupled between said output of said differential amplifier and a first terminal of said second transmission line; and
    wherein said loopback prevention circuit further includes a sixth FET having a grounded gate, a source of said sixth FET coupled to a gate of said fifth FET, a drain of said sixth FET coupled to said first terminal of said second transmission line.

7. The line driver of claim 6, wherein said second differential switch further comprises:
    a seventh FET coupled between said output of said differential amplifier and a second terminal of said second transmission line; and
    wherein said loopback prevention circuit further includes an eighth FET having a grounded gate, a source of said eighth FET coupled to a gate of said seventh FET, a drain of said seventh FET coupled to said second terminal of said second transmission line.

8. The line driver of claim 4, wherein said loopback prevention circuit is configured to prevent said first FET from conducting when a negative pulse is incident on said first transmission line during said power down mode.

9. The line driver of claim 8, wherein said loopback prevention circuit is configured to apply said negative pulse to said gate of said first FET.

10. The line driver of claim 1, wherein said differential amplifier comprises:
    a first FET, a source of said first FET coupled to a bias voltage, a gate of said first FET coupled to a bias control signal;
    a second FET, a source of said second FET coupled to a drain of said first FET, a gate of said second FET coupled to said input signal, a drain of said second FET coupled to said first differential switch and said second differential switch; and
    a third FET, a source of said third FET coupled to said drain of said first FET, a gate of said third FET coupled to said input signal, a drain of said third FET coupled to said first differential switch and said second differential switch.

11. The line driver of claim 10, wherein said first differential switch comprises:
    a first switch, having an input coupled to said drain of said second FET and an output coupled to first of said first of said two transmission line; and
    a second switch, having an input coupled to said drain of said third FET and an output coupled to said second of said first of said two transmission line; wherein
    said first and said second switches open and close in response to said first control signal.

12. The line driver of claim 11, wherein said second differential switch comprises:
    a third switch, having an input coupled to said drain of said second FET and an output coupled to first of said second of said two transmission line; and
    a fourth switch, having an input coupled to said drain of said third FET and an output coupled to said second of said second of said two transmission line;
    wherein said third and said fourth switches open and close in response to said second control signal.

13. The line driver of claim 12, wherein:
    said first switch comprises a fourth FET;
    said second switch comprises a fifth FET;
    said third switch comprises a sixth FET; and
    said fourth switch comprises a seventh FET; wherein
    a gate of said fourth FET and a gate of said fifth FET are controlled by said first control signal; and a gate of said sixth FET and a gate of said seventh FET are controlled by said second control signal.

14. The line driver of claim 13, further comprising:

an eighth FET, having a source coupled to said gate of said fourth FET, a gate coupled to a ground and a drain coupled to said drain of said fourth FET;

a ninth FET, having a source coupled to said gate of said second FET, a gate coupled to said ground and a drain coupled to said drain of said second FET;

a tenth FET, having a source coupled to said gate of said first FET, a gate coupled to said ground and a drain coupled to said drain of said first FET; and an eleventh FET, having a source coupled to said gate of said third FET, a gate coupled to said ground and a drain coupled to said drain of said third FET, wherein said eighth, ninth, tenth, and eleventh FETs prevent signal feedthrough from looping back when NIC power is secured.

15. A line driver, comprising:

differential amplifier for differentially amplifying an input signal to produce a differential amplified signal;

selective coupling means for selectively coupling said differential amplified signal to one of two transmissions lines; and loopback prevention means for preventing signal loopback from one of said two transmission lines to the other when circuit power is removed.

16. A line driver, for driving one of two transmission lines, comprising:

a differential amplifier that receives an input signal;

a first differential switch having an input coupled to an output of said differential amplifier and an output coupled to a first of said two transmission lines, said first differential switch including,
  a first FET coupled between said output of said differential amplifier and a first terminal of said first transmission line; and
  a second FET having a grounded gate, a source of said second FET coupled to a gate of said first FET, a drain of said second FET coupled to said first terminal of said first transmission line;

a second differential switch having an input coupled to said output of said differential amplifier and an output coupled to a second of said two transmission lines, said second differential switch including,
  a third FET coupled between said output of said differential amplifier and a first terminal of said second transmission line; and
  a fourth FET having a grounded gate, a source of said fourth FET coupled to a gate of said third FET, a drain of said fourth FET coupled to said first terminal of said second transmission line.

17. The line driver of claim 16, wherein said second FET prevents said first FET from conducting when a negative pulse is received over said first transmission line during a power down mode.

18. The line driver of claim 16, wherein said fourth FET prevents said third FET from conducting when a negative pulse is received over said second transmission line during a power down mode.

19. The line driver of claim 16, wherein said first differential switch further includes:

a fifth FET coupled between said output of said differential amplifier and a second terminal of said first transmission line; and a sixth FET having a grounded gate, a source of said sixth FET coupled to a gate of said fifth FET, a drain of said sixth FET coupled to said second terminal of said first transmission line.

20. The line driver of claim 19, wherein said second differential switch further includes:

a seventh FET coupled between said output of said differential amplifier and a second terminal of said second transmission line; and an eighth FET having a grounded gate, a source of said eighth FET coupled to a gate of said seventh FET, a drain of said eighth FET coupled to said second terminal of said second transmission line.

* * * * *

UNITED STATES PATENT AND TRADEMARK OFFICE
CERTIFICATE OF CORRECTION

PATENT NO. : 6,703,865 B2  Page 1 of 1
DATED : March 9, 2004
INVENTOR(S) : Kevin T. Chan It is certified that error appears in the above-identified patent and that said Letters Patent is hereby corrected as shown below:

Title page,
Item [57], ABSTRACT,
Line 13, please replace "to an prevent" with -- to prevent --.

Column 10,
Lines 42 and 53, please replace "to first" with -- to a first --.
Lines 43, 54 and 57, please replace "line;" with -- lines; --.
Lines 45 and 56, please replace "to said second" with -- to a second --.

Signed and Sealed this

Ninth Day of November, 2004

JON W. DUDAS
*Director of the United States Patent and Trademark Office*